S. KUCZYNSKI.
TROLLEY WHEEL GUARD.
APPLICATION FILED JULY 7, 1920.
1,357,642.
Patented Nov. 2, 1920.
2 SHEETS—SHEET 1.
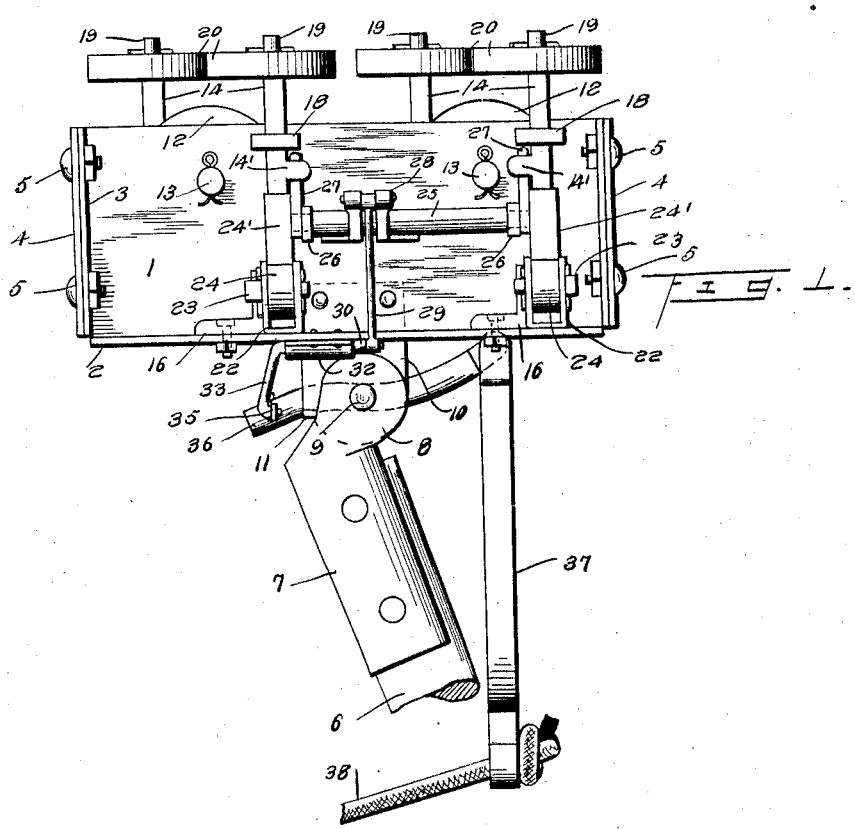
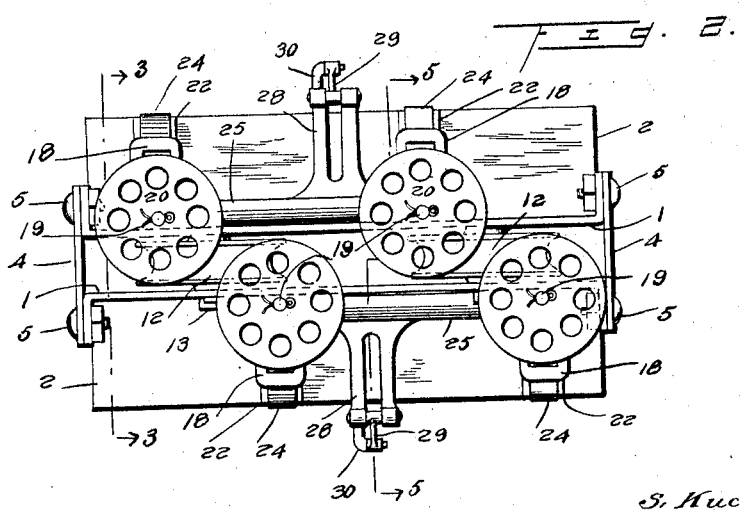
Inventor
S. Kuczynski
By A. M. Wilson
Attorney

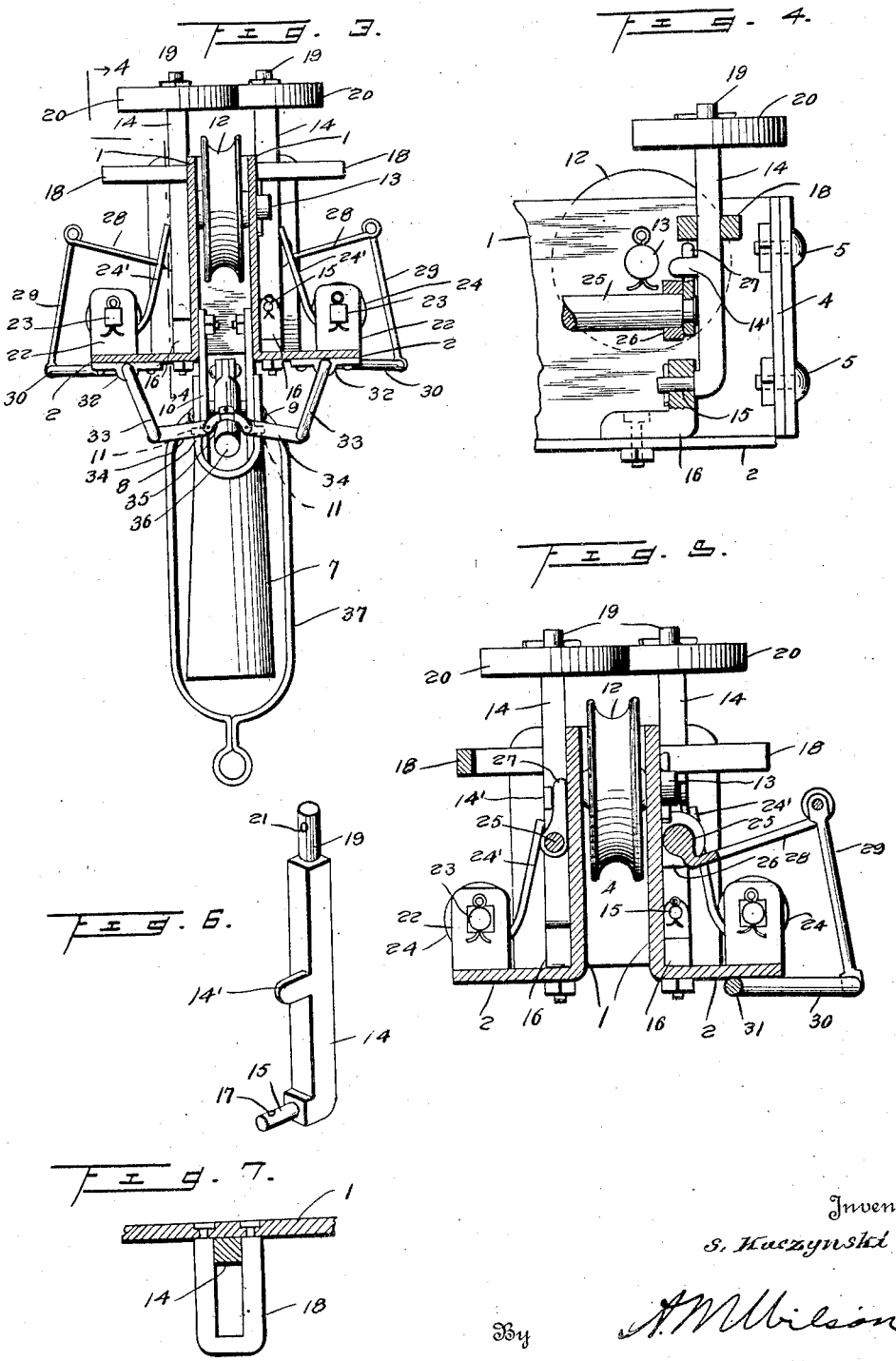

UNITED STATES PATENT OFFICE.

STANISLAW KUCZYNSKI, OF NATRONA, PENNSYLVANIA, ASSIGNOR OF ONE-HALF TO BRONISLAW GRUCHACZ, OF NATRONA, PENNSYLVANIA.

TROLLEY-WHEEL GUARD.

1,357,642.  Specification of Letters Patent.  Patented Nov. 2, 1920.

Application filed July 7, 1920. Serial No. 394,419.

*To all whom it may concern:*

Be it known that I, STANISLAW KUCZYNSKI, a citizen of Poland, residing at Natrona, in the county of Allegheny and State of Pennsylvania, have invented certain new and useful Improvements in Trolley-Wheel Guards, of which the following is a specification.

This invention relates to certain new and useful improvements in trolley wheel guards and has for its primary object to provide a plurality of shiftably mounted guard wheels operable from a point adjacent the platform of a car to move the same and permit a trolley wire to be engaged by the trolley wheel with the guard wheels shifted to their closed position to prevent the escape of the trolley wheel from the wire.

A further object of the invention is to provide a plurality of shiftably mounted guard rollers for a trolley wheel that are manually operable to position the same to permit the trolley wheel being placed upon the trolley wire and are automatic in operation to permit the trolley wheel and harp to pass over a switch plate or crossing.

With the above and other objects in view, the present invention consists in the novel form, combination and arrangement of parts hereinafter more fully described and shown in the accompanying drawings, wherein like reference characters indicate similar parts throughout the several views.

In the drawings,

Figure 1 is a side elevational view of a trolley head constructed in accordance with the present invention, showing the guard rollers positioned above the trolley wheels, Fig. 2 is a top plan view of the same showing the guard rollers positioned above and overlying the trolley wheels, Fig. 3 is a cross sectional view taken on line III—III of Fig. 2 showing the operating cranks for shifting the guard wheels, Fig. 4 is a cross sectional view taken on line IV—IV of Fig. 3 showing the pivotal mounting and shifting means for the guard roller supporting arm, Fig. 5 is a cross sectional view taken on line V—V of Fig. 2 showing the band springs for holding the guard roller supporting arms in operative position, Fig. 6 is a perspective view of one of the guard roller supporting arms removed from the trolley head and Fig. 7 is a detail sectional view of a part of the head showing the U-shaped guide strap for the guard roller supporting arms.

Referring more in detail to the accompanying drawings, there is illustrated a trolley wheel guard adapted for maintaining a trolley wheel or wheels operatively positioned on a trolley wire, the trolley head comprising a pair of spaced side plates 1 having outwardly bent lower extensions 2 extending in the same plane and vertical end flanges 3 secured to the end plates 4 by the fastening bolts 5 as clearly shown in Figs. 1, 2, and 4. The end plates 4 maintain the spaced side plates 1 of the trolley head relatively immovable while the operating mechanism for the guard devices is supported on the outer faces of the side walls and the side extensions 2. The structure described is supported on the upper end of a trolley pole 6 by a circular clamp 7 having ears 8 at its upper end that are pivotally mounted upon the bolt 9 carried by the hangers 10 depending centrally from the side walls 1 and carried by the opposed face thereof, while pivotal movement of the frame upon the clamp 7 is limited in one direction by the lateral lugs 11 formed on the lower ends of the hangers 10 and engaging the upper edge of the clamp. A pair of trolley wheels 12 are journaled between the side plates 1 upon the transverse bolts 13 with the wire engaging side of the wheel extending above the upper edges of the side plates 1.

The guard devices for maintaining the wheels in tracking engagement with the wire includes the mounting of similar devices on each side plate and extensions 1 and 2, each device comprising a vertical arm 14 preferably rectangular in cross section as shown in Fig. 6 with a bearing pin 15 projecting laterally from the lower end thereof for pivotal mounting within an angle bracket 16 as shown in Fig. 4, while a cotter extends through the opening 17 in the bearing pin, the swinging movement of the arm 14 being limited by the U-shaped strap 18 carried by the side wall 1 through which the upper end of the arm 14 freely projects, the upper end of the arm 14 being provided with a cylindrical bearing 19 that rotatably receives a guard roller 20 retained thereon by a cotter pin passing through the opening 21 in the bearing 19. In order to retain the arm 14 in its vertical position with the guard roller 20 overlying the trolley wheel 12, there is provided a U-shaped support 22 fixed to the side extension 2 and having a pin 23 fixed therein and upon which one end of a band coil spring 24 is fixed, the free end 24' of the spring engaging the outer face of the arm 14 as clearly shown in Figs. 1 and 5.

The mechanism for shifting the guard roller supporting arms to their inoperative position to permit the positioning of the trolley wheels upon a trolley wire includes the mounting of a horizontal shaft 25 in end bearings 26 carried by the outer face of the wall 1 while end extensions 27 carried by the shaft are positioned rearwardly of the lateral fingers 14' of the arms, the band springs 24 holding the arm extensions in their vertical position. A bifurcated lever 28 extends outwardly from the arm 25 intermediate the ends thereof, and has a link connection 29 with one end 30 of a crank arm 31, the crank 31 being pivotally mounted in a bearing 32 secured to the under face of the plate extension 1, the other end 33 of the crank being connected to a link 34, while the inner ends of each link upon the opposite plates are connected to a substantially U-shaped member 35. A lever 36 of the form best illustrated in Figs. 1 and 3 is pivotally mounted upon the pin 9 between the hangers 10, one end of which extends beneath the connecting member 35 while the other end is connected to an operating arm 37 to which a rope 38 is attached that extends in proximity of the car.

From the above detailed description of the device, it is believed that the construction and operation will at once be apparent, it being noted that a downward pull upon the arm 37 will move the lever 36 to elevate the link connections 34 and the ends 33 of the crank 32, thus lowering the ends 30 of the crank arms as well as the links 29 and the levers 28, thereby rotating the shaft 25 and causing the end extensions 27 thereof to engage the arm fingers 14' to shift the arms 14 against the tension of the band springs 24 to remove the guard wheels 20 from their normal guarding position overlying the trolley wheels 12. When pressure is relieved upon the arm 37 the springs 24 will restore the arms 14 to their vertical position and replace the guard rollers 20 in their guarding positions overlying the trolley wheels 12. Also, the particular disposition of the guard wheels will permit the passage of the trolley head over crossovers as well as switch plates.

While there is herein shown and described the preferred embodiment of the invention, it is nevertheless to be understood that minor changes may be made therein without departing from the spirit and scope of the invention.

What is claimed as new is:

1. In a trolley head, a pair of plates, trolley wheels journaled between the plates, arms pivoted to each plate, a guard roller journaled in the upper end of each arm and overlying the trolley wheels, means for shifting the arms to position the guard rollers laterally of the trolley wheels, said means including a shaft journaled to each plate, connections between said shafts and arms, means for simultaneously operating the shafts, a bell crank attached to each plate, a link connection between the bell cranks and the rotatable shafts and means for simultaneously operating the bell cranks to move the arms and guard wheels supported thereon to a position laterally of the trolley wheels.

2. In a trolley head, a pair of plates, trolley wheels journaled between the plates, arms pivoted to each plate, a guard roller journaled in the upper end of each arm and overlying the trolley wheels, means for shifting the arms to position the guard rollers laterally of the trolley wheels, said means including a shaft journaled to each plate, connections between said shafts and arms, means for simultaneously operating the shafts, a bell crank attached to each plate, a link connection between the bell cranks and the rotatable shafts, a lever pivotally mounted beneath said plates for engagement with the bell cranks and means for operating the lever to simultaneously shift the guard wheel supporting arms.

3. A trolley head of the type described comprising spaced plates, trolley wheels journaled therein, guards for the wheels including a shaft journaled to each plate, tensioned arms pivoted to the plates, guard wheels carried by the arms overlying the trolley wheels, finger extensions carried by the arms, end extensions carried by the shafts for engagement with said fingers and means for operating both of said shafts to simultaneously shift all of said arms to position the guard wheels laterally of the trolley wheels.

In testimony whereof I affix my signature.

STANISLAW KUCZYNSKI.